(12) United States Patent
Yang et al.

(10) Patent No.: US 11,036,280 B2
(45) Date of Patent: Jun. 15, 2021

(54) ELECTRONIC DEVICE CONTROL BASED ON ROTATION ANGLE OF DISPLAY UNITS

(71) Applicant: HEWLETT-PACKARD DEVELOPMENT COMPANY, L.P., Spring, TX (US)

(72) Inventors: Po-Kuei Yang, Taipei (TW); Ann Weng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 16/469,639

(22) PCT Filed: Apr. 4, 2017

(86) PCT No.: PCT/US2017/025814
§ 371 (c)(1),
(2) Date: Jun. 14, 2019

(87) PCT Pub. No.: WO2018/186831
PCT Pub. Date: Oct. 11, 2018

(65) Prior Publication Data
US 2020/0081518 A1    Mar. 12, 2020

(51) Int. Cl.
*G06F 1/00* (2006.01)
*G06F 1/3287* (2019.01)
*G06F 1/16* (2006.01)
*G06F 1/3218* (2019.01)
*G06F 1/3203* (2019.01)

(52) U.S. Cl.
CPC .......... *G06F 1/3287* (2013.01); *G06F 1/1616* (2013.01); *G06F 1/1677* (2013.01); *G06F 1/3218* (2013.01); *G06F 1/1681* (2013.01); *G06F 1/3203* (2013.01)

(58) Field of Classification Search
CPC .... G06F 1/3287; G06F 1/1616; G06F 1/1677; G06F 1/3218; G06F 1/1681
USPC .......................................... 713/324
See application file for complete search history.

(56) References Cited

U.S. PATENT DOCUMENTS

| | | | |
|---|---|---|---|
| 5,077,551 A * | 12/1991 | Saitou | G06F 1/1679 345/207 |
| 8,203,833 B2 | 6/2012 | Huang et al. | |
| 84,564,949 | 10/2013 | Du et al. | |
| 8,773,326 B2 | 7/2014 | Yamamoto et al. | |
| 9,298,296 B2 * | 3/2016 | Park | G06F 1/1677 |

(Continued)

FOREIGN PATENT DOCUMENTS

EP    2402842 A1    1/2012

OTHER PUBLICATIONS

Covert, A., Microsoft Surface is Hiding a Pressure-sensitive Keyboard, Multitouch Trackpad and Kickstand. Jun.18, 2012, < http://gizmode.com/5919425/microsoft-surface-is-hiding-a-pressure-sensitive-keyboard-and-built-in-kickstand >.

*Primary Examiner* — Volvick Derose
(74) *Attorney, Agent, or Firm* — HPI Patent Department

(57) ABSTRACT

In one example, an electronic device is described, which includes a main body, a display unit pivotally connected to the main body, an angle detection unit disposed in the display unit to determine angle of rotation of the display unit relative to the main body, and a control unit to execute at least one command to control the electronic device based on the determined angle of rotation.

14 Claims, 4 Drawing Sheets

(56) References Cited

U.S. PATENT DOCUMENTS

| | | | |
|---|---|---|---|
| 2003/0011972 A1* | 1/2003 | Koo | G06F 1/1616 361/679.27 |
| 2005/0038982 A1* | 2/2005 | Park | G06F 1/1677 713/1 |
| 2006/0139326 A1* | 6/2006 | Tsukamoto | G06F 1/3203 345/158 |
| 2006/0238439 A1* | 10/2006 | Fuller | G06F 1/1616 345/1.1 |
| 2011/0161710 A1* | 6/2011 | Huang | G06F 1/1616 713/324 |
| 2011/0179864 A1* | 7/2011 | Raasch | G06F 1/3203 73/493 |
| 2012/0001943 A1* | 1/2012 | Ishidera | G06F 3/0346 345/659 |
| 2012/0188148 A1 | 7/2012 | Dejong | |
| 2012/0278638 A1* | 11/2012 | Wang | G06F 1/3206 713/320 |
| 2013/0106704 A1* | 5/2013 | Vidal | G06F 3/0227 345/169 |
| 2015/0097788 A1* | 4/2015 | Sip | G06F 3/038 345/173 |
| 2017/0010636 A1* | 1/2017 | Shao | G06F 1/1677 |
| 2017/0019636 A1 | 1/2017 | Kitazawa et al. | |

\* cited by examiner

ELECTRONIC DEVICE CONTROL BASED ON ROTATION ANGLE OF DISPLAY UNITS

BACKGROUND

Portable electronic devices, such as laptop computers, have become popular because of lightweight and smaller size compared with desktop computers. An electronic device may include a main body and a display unit, which are pivotally interconnected with each other, such that the display unit can be swiveled to a desired position relative to the main body. The electronic device may use batteries to supply power to various components within the electronic device. The components may consume power when the electronic device is turned on.

BRIEF DESCRIPTION OF THE DRAWINGS

Examples are described in the following detailed description and in reference to the drawings, in which.

DETAILED DESCRIPTION

Electronic devices may include a main body and a display unit, which are pivotally interconnected with each other. An electronic device may use batteries to supply power to various components within the electronic device. The components may need to be turned off when not in use to reduce power consumption of the electronic device. For example, a user may close a display unit to a certain angle when not using the electronic device, for instance, when the user leaving the desk, when the user carrying the electronic device or to hide the display from others. When the display unit of the electronic device is at an angle, for instance, less than or equal to 60 degrees relative to the main body, the user may not be looking at a display screen. During this time, the display screen may be in on-state and consume battery power. Further, users may set a time for turning off the display screen. In this case, the electronic device may consume power until the time set for turning off the display is completed.

Examples described herein may provide an electronic device including a main body and a display unit pivotally connected to the main body. Further, the electronic device may include an angle detection unit disposed in the display unit to determine angle of rotation of the display unit relative to the main body and a control unit to execute at least one command to control the electronic device based on the determined angle of rotation. The angle detection unit may include an accelerometer disposed below a display screen of the display unit.

Using the accelerometer in the display unit to determine the angle of rotation of the display unit can eliminate the use of magnets to switch off display screen. Thereby, reducing/eliminating the magnets influence on Wi-Fi signals and saving bill of materials cost of the magnets. Further, the accelerometer is disposed in the display unit compared to placing sensors in the hinges, thus reducing the size of the hinges (i.e., thinner hinges).

Figure 1A:
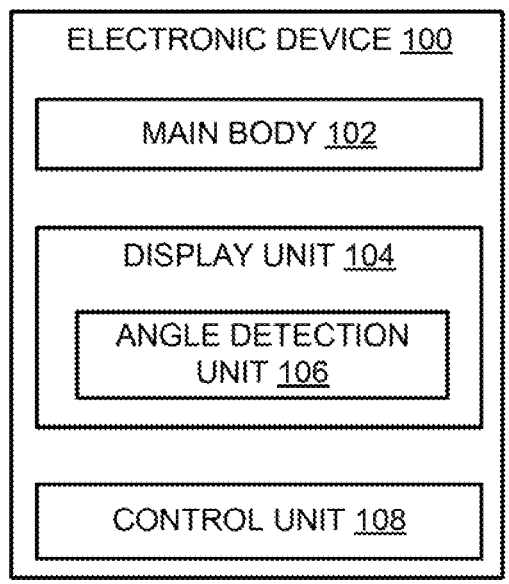
FIG. 1A is a block diagram of an example electronic device including an angle detection unit.

Turning now to figures, FIG. 1A is a block diagram of an example electronic device 100 including an angle detection unit 106. Electronic device 100 may include a main body 102 and a display unit 104 pivotally connected to main body 102. Example electronic device 100 may include a laptop computer, a notebook computer, a convertible device, and the like. Convertible devices may refer to devices that can be configured in either a laptop mode or a tablet mode. In the tablet mode, display unit 104 is closed with a display facing up and viewable, i.e., display unit 104 may be substantially parallel to and adjacent to main body 102. In the laptop mode, display unit 104 is open in an upright position with respect to main body 102, i.e., main body 102 may form an angle between about 90° and 180° relative to display unit 104 with the linking member attached at the back of main body 102.

Further, electronic device 100 may include angle detection unit 106 disposed in display unit 104 to determine an angle of rotation of display unit 104 relative to main body 102. Furthermore, electronic device 100 may include a control unit 108 to execute at least one command to control electronic device 100 based on the determined angle of rotation.

Figure 1B:
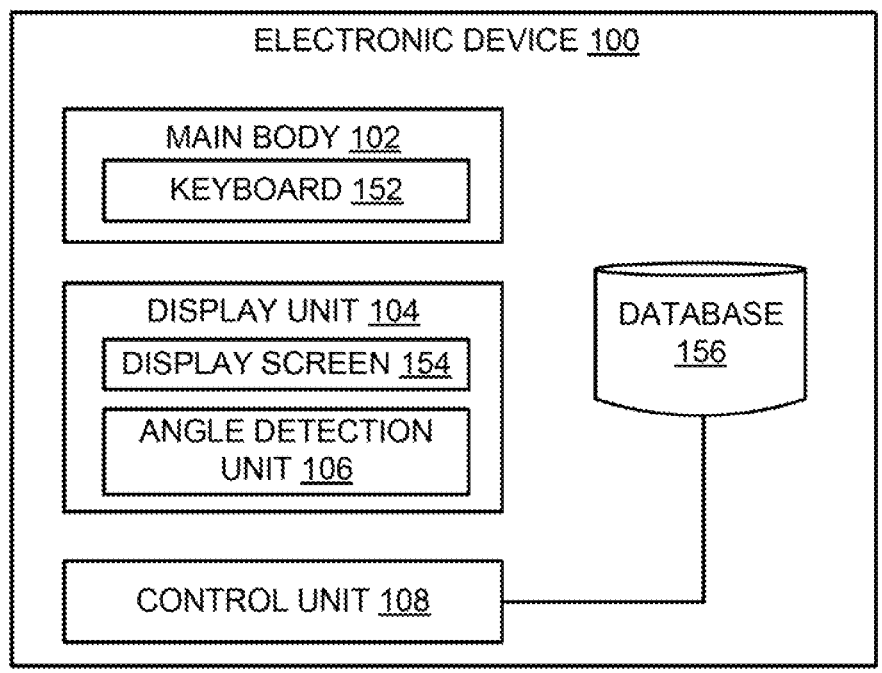
FIG. 1B is a block diagram of the example electronic device depicting additional components.

FIG. 1B is a block diagram of example electronic device 100 depicting additional components. As shown in FIG. 1B, main body 102 may be at least equipped with a keyboard 152 and a cursor control module to be input information by users. In another example, main body 102 can house multiple components such as keys of keyboard 152, processor, memory, a battery, a communication module, and/or additional components. Further, display unit 104 can be at least equipped with a display screen 154 to output visual information for users. In another example, display unit 104 can house multiple components such a camera, a microphone an antenna, and/or other components. Example display screen 154 can be based on various technologies, such as liquid crystal display (LCD) technology, LED display technology, organic LED (OLEO) technology, or the like. Display screen 154 can be a flat panel display.

Furthermore, electronic device 100 may include a database 156 to store a plurality of commands corresponding to predetermined angle ranges. The plurality of commands may be predefined by a user or default commands. During operation, angle detection unit 106 can be used to determine an angle of display unit 104 relative to main body 102. Angle detection unit 106 can be an accelerometer to measure the angle. Accelerometer may detect the angle of rotation based on determining a current degree of display unit 104 and a movement of display unit 104 relative to main body 102. In one example, the accelerometer is disposed below display screen 154 of display unit 104.

Control unit 108 may execute at least one command to control electronic device 100 based on the determined angle of rotation. The at least one command may be retrieved from database 156. The at least one command may be executed to turn off the camera, turn off display screen 154, turn off the microphone, turn off keyboard 152, minimizing applications, placing electronic device 100 in a hibernation mode or standby mode, shutting down electronic device 100, and/or providing a login access to electronic device 100.

Control unit 108 may execute different commands according to different included angles, i.e., the included angle between main body 102 and display unit 104. In one example, a user may set a scenario of "switching off the display screen's power at the included angle under 50 degrees. In another example, another user may set a scenario of "enabling a sleep mode at the included angle under 30 degrees".

In another example, control unit 108 may determine whether the angle of rotation falls within at least one predetermined angle range stored in database 156. Control unit 108 may retrieve command(s) corresponding to the predetermined angle ranges from database 156 when the determined angle of rotation falls within the predetermined angle ranges. Control unit 108 may execute the retrieved commands corresponding to the predetermined angle ranges to control electronic device 100.

For example, a user may seta scenario of turning off display screen 154 when the angle of rotation is in a range of 0 to 75 degrees and turning off the microphone when the angle of rotation is in a range 0 to 25 degrees. When the angle of rotation between main body 102 and display unit 104 is less than 25 degrees, control unit 108 may retrieve two commands corresponding to two predetermined angle ranges, i.e., 0 to 75 degrees and 0 to 25 degrees. Further, control unit 108 may execute the two commands corresponding to the two predetermined angle ranges to turn off the microphone and to turn off display screen 154. In one example, the control unit 108 may execute the two commands in a sequence, i.e., first turns off display screen 154 when the angle falls below 75 degrees and then turns off the microphone when the angle falls below 25 degrees.

Control unit 108 may include, for example, hardware devices including electronic circuitry for implementing the functionality described herein. In addition or as an alternative, control unit 108 may be implemented as a series of instructions encoded on a machine-readable storage medium of electronic device 100 and executable by processor. In examples described herein, the processor may include, for example, one processor or multiple processors included in a single device or distributed across multiple devices. It should be noted that, in some embodiments, some modules are implemented as hardware devices, while other modules are implemented as executable instructions.

Figure 2A:
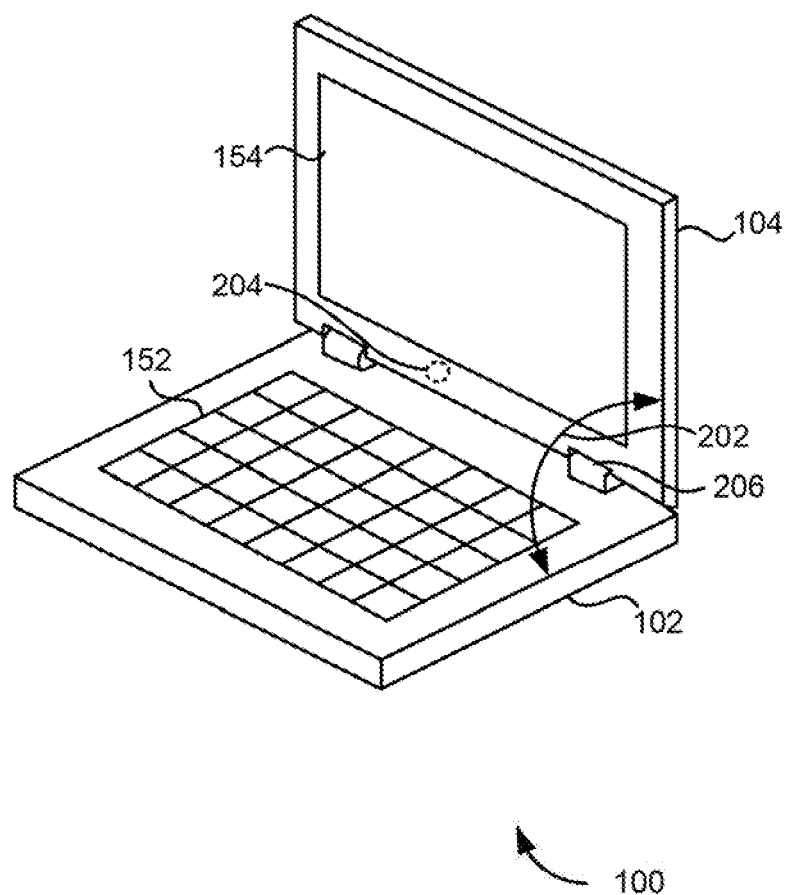
FIG. 2A is a schematic diagram of an example electronic device, depicting a sensor in a display unit to determine an angle of rotation of the display unit relative to a main body.

FIG. 2A is a schematic diagram of example electronic device 100, depicting a sensor 204 (e.g., angle detection unit 106) in display unit 104 to determine an angle of rotation (e.g., 202) of display unit 104 relative to main body 102. As shown in FIG. 2A, display unit 104 is pivotally connected to main body 102. The pivotal connection may include a hinge or multiple hinges (i.e., 206). The pivotal connection can connect main body 102 to display unit 104 physically and/or electronically. For example, wires for display, power, etc. can be connected using hinge or hinges 206. As shown in FIG. 2A, sensor 204 (e.g., accelerometer) disposed below display screen 154 of display unit 104 may detect angle of rotation 202 of display unit 104 relative to main body 102. For example, knowing the fixed position and orientation of the accelerometer, and the relative rotational movement with respect to horizontal, angle of rotation 202 can be calculated.

Figure 2B:
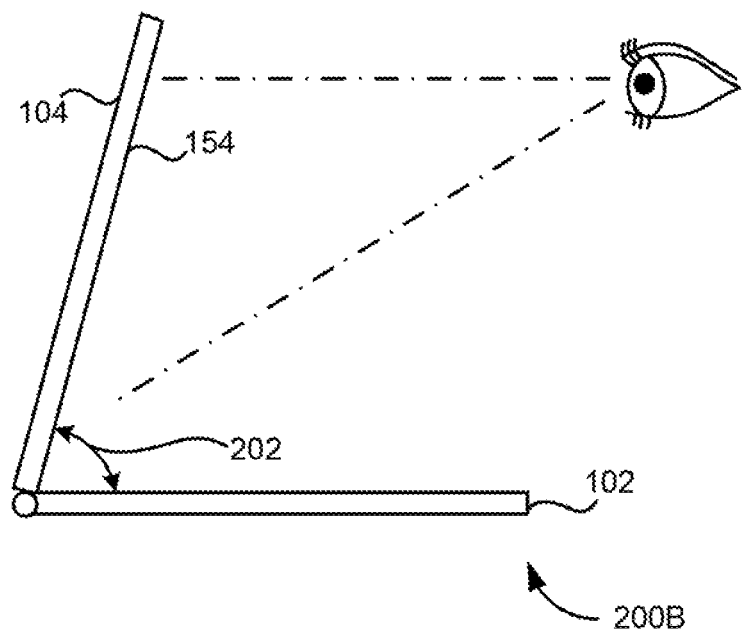
FIGS. 2B and 2C depict a side view of the example electronic device of FIG. 2A, illustrating turning off a display screen based on the angle of rotation of the display unit relative to the main body.
Figure 2C:
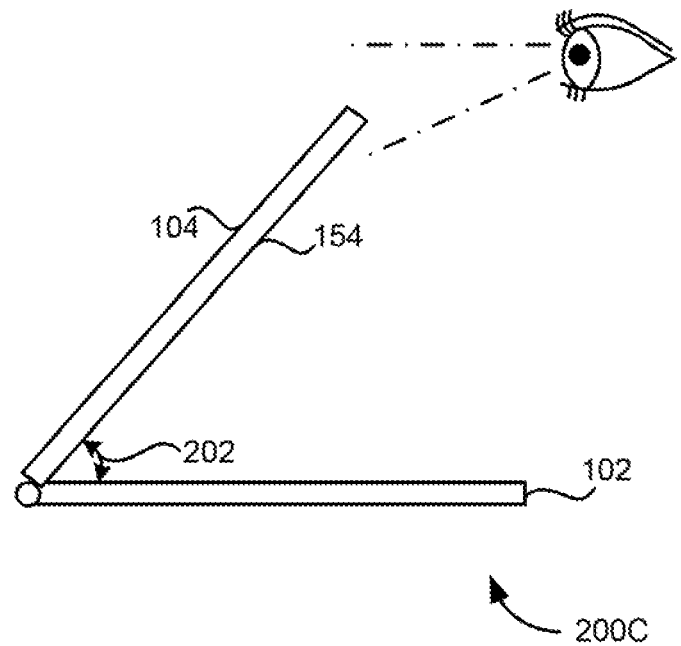

FIGS. 2B and 2C depict a side view of example electronic device 100 of FIG. 2A, illustrating turning off display screen 154 based on angle of rotation 202 of display unit 104 relative to main body 102. As shown in 200B of FIG. 2B, when display unit 104 is opened greater than 60 degrees relative to main body 102, a user can be able to see display screen 154. As shown in 200C of FIG. 2C, when display unit 104 is opened less than 60 degrees relative to main body 102, the user may not be able to see display screen 154, Sensor 204 disposed below display screen 154 may detect that angle of rotation 202 of display unit 104 is less than 60 degrees and control unit 108 may execute a predefined or default command to turn off display screen 154 to reduce power consumption.

Figure 3:
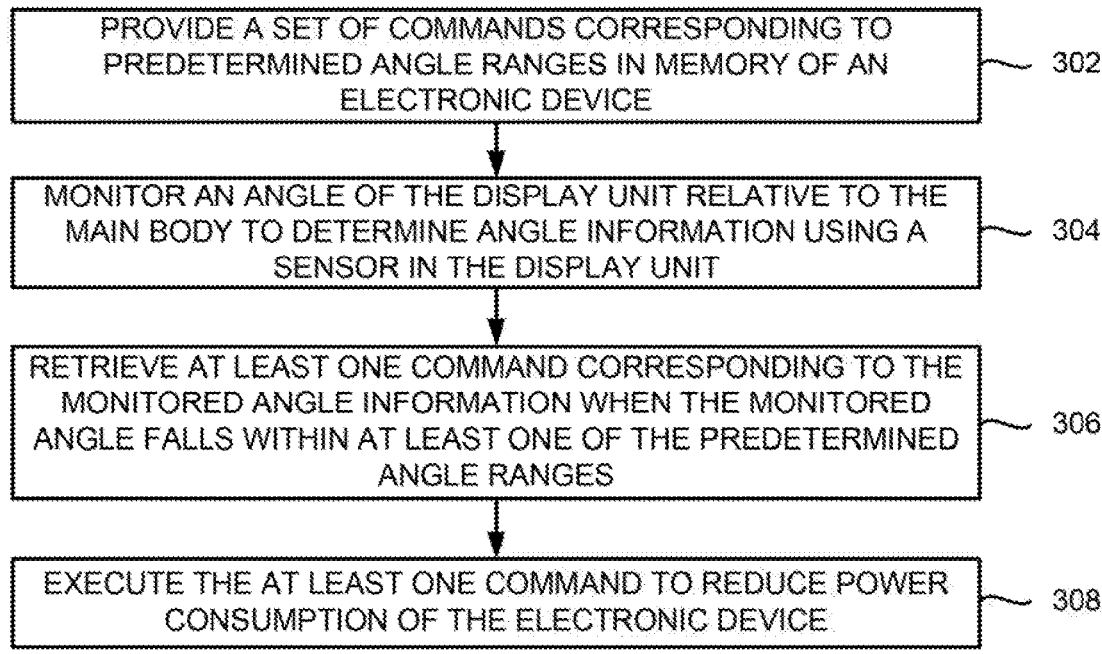
FIG. 3 depicts an example flow chart for controlling an electronic device based on an angle of rotation of a display unit relative to a main body.

FIG. 3 depicts an example flow chart 300 for controlling an electronic device based on an angle of rotation of a display unit relative to a main body. Method 300 may be implemented in the form of executable instructions stored on a machine-readable storage medium and/or in the form of electronic circuitry.

At 302, a set of commands corresponding to predetermined angle ranges may be provided or defined in memory of an electronic device. The electronic device may include a main body and a display unit hinged to the main body. At 304, an angle of the display unit relative to the main body may be monitored to determine angle information using a sensor in the display unit. In one example, the sensor may be disposed under a display screen of the display unit. Example sensor may include a three-axis accelerometer.

At 306, at least one command corresponding to the monitored angle information may be retrieved from the set of commands when the monitored angle falls within at least one of the predetermined angle ranges. In one example, a plurality of values of the angle of the display unit relative to the main body may be determined based on the determined angle information. Further, a set of commands corresponding to the plurality of values may be retrieved. For example, a first command can be retrieved when the value of the angle reaches at least a first predetermined angle range. A second command can be retrieved when the value of the angle is at least at a second predetermined angle range.

At 308, the at least one command may be executed to reduce power consumption of the electronic device. In one example, the set of commands at different included angles between the display unit and the main body may be progressively executed when the display unit is rotated relative to the main body. The at least one command may be a default command or a predefined command. In addition, users may set or define "what orders or functions will be executed at what included angle". For example, the commands may be defined by the user to perform at least one of:

turning off a camera when the angle of rotation is in a range of 0 to 75 degrees or 135 to 315 degrees,
    turning off a display screen when the angle of rotation is in a range of 0 to 75 degrees,
    placing the electronic device in a hibernation mode when the angle of rotation is in a range of 26 to 60 degrees,
    placing the electronic device in a standby mode when the angle of rotation is in a range of 61 to 75 degrees,
    shutting down the electronic device when the angle of rotation is in a range of 0 to 25 degrees,
    turning off a microphone when the angle of rotation is in a range 0 to 25 degrees,
    turning off a keyboard when the angle of rotation is in a range of 0 to 75 degrees or 181 to 360 degrees,
    minimizing applications on a display screen when the angle of rotation is in a range of 0 to 75 degrees, and
    providing login accessibility when the angle of rotation is in a range 80 to 180 degrees.

In another example, various other functions may be performed according to the angle of the display unit and the main body. For example, other functions may include enabling a power-saving mode when the angle of the display unit and the main body is between 0 degrees and 30 degrees, an electronic notebook mode between 30 degrees and 180 degrees, and a tablet mode between 180 degrees and 360 degrees. The power-saving mode discontinues power to the display screen and operates the electronic device with minimum power.

Figure 4:
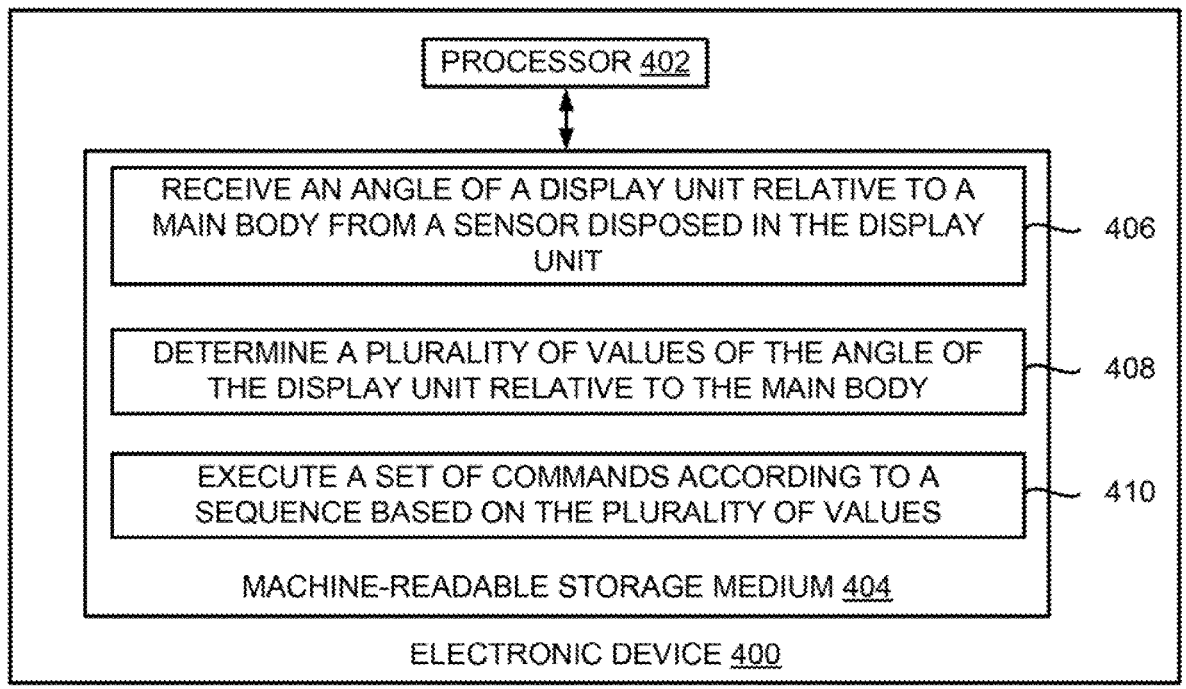
FIG. 4 depicts a block diagram of an example electronic device to execute a set of commands based on a plurality of values of an angle of a display unit relative to a main body.

FIG. 4 depicts a block diagram of an example electronic device 400 to execute a set of commands based on a plurality of values of an angle of a display unit relative to a main body. Electronic device 400 may include a processor 402 and a machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like, in an example, machine-readable storage medium 404 may be a non-transitory machine-readable medium. In an example, machine-readable storage medium 404 may be remote but accessible to electronic device 400.

Machine-readable storage medium 404 may store instructions 406-410. In an example, instructions 406-410 may be executed by processor 402 to control media content of source devices. Instructions 406 may be executed by processor 402 to receive an angle of a display unit relative to a main body from a sensor disposed in the display unit. The display unit is pivotally connected to the main body of electronic device 400. The sensor may be an accelerometer positioned under a display of the display unit to detect angle of rotation of the display unit relative to the main body.

Instructions 408 may be executed by processor 402 to determine a plurality of values of the angle of the display unit relative to the main body. Instructions 410 may be executed by processor 402 to execute a set of commands according to a sequence based on the plurality of values. The set of commands may be executed to turn off components of the electronic device for reducing power consumption of electronic device 400. For example, each command may correspond to one of the components of electronic device 400. The set of commands may include default commands or pre-defined commands.

In one example, executing the set of commands may include determining whether each value of the plurality of values falls within predetermined angle, ranges stored in a database and controlling the electronic device to execute the set of commands defined in the database corresponding to each value that falls within the predetermined angle ranges.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
    a main body;
    a hinge;
    a display unit pivotally connected to the main body via the hinge;
    an angle detection unit disposed in the display unit and located below a display screen of the display unit and substantially in the middle of the display unit to reduce a size of the hinge, the angle detection unit to determine an angle of rotation of the display unit relative to the main body; and
    a control unit to execute at least one command to control the electronic device based on the determined angle of rotation.

2. The electronic device of claim 1, wherein the angle detection unit comprises an accelerometer to detect the angle of rotation based on determining a current degree of the display unit and a movement of the display unit relative to the main body.

3. The electronic device of claim 1, wherein the at least one command is executed to perform at least one of turning off a camera, turning off a display screen, turning off a microphone, turning off a keyboard, minimizing applications, placing the electronic device in a hibernation mode or standby mode, shutting down the electronic device, and providing a login access to the electronic device.

4. The electronic device of claim 1, wherein the at least one command comprises a default command or a pre-defined command.

5. The electronic device of claim 1, further comprising:
    a database to store a plurality of commands corresponding to predetermined angle ranges, wherein the control unit is to:
        determine whether the angle of rotation falls within at least one predetermined angle range stored in the database;
        retrieve the at least one command corresponding to the at least one predetermined angle range from the database when the determined angle of rotation falls within the at least one predetermined angle range; and
        execute the at least one retrieved command corresponding to the at least one predetermined angle range to control the electronic device.

6. A non-transitory machine-readable storage medium storing instructions that, when executed by a processor of an electronic device, cause the electronic device to:

receive an angle of a display unit relative to a main body from a sensor disposed in the display unit and located below a display screen of the display unit and substantially in the middle of the display unit to reduce a size of a hinge, wherein the display unit is pivotally connected to the main body of the electronic device via the hinge;

determine a plurality of values of the angle of the display unit relative to the main body; and execute a set of commands according to a sequence based on the plurality of values.

7. The non-transitory machine-readable storage medium of claim 6, wherein the sensor comprises an accelerometer positioned under a display of the display unit to detect the angle of the display unit relative to the main body.

8. The non-transitory machine-readable storage medium of claim 6, wherein the set of commands are executed to turn off components of the electronic device for reducing power consumption of the electronic device, wherein each command corresponds to one of the components.

9. The non-transitory machine-readable storage medium of claim 6, wherein executing the set of commands comprises:

determining whether each value of the plurality of values falls within predetermined angle ranges stored in a database; and controlling the electronic device to execute the set of commands defined in the database corresponding to each value that falls within the predetermined angle ranges, wherein the set of commands comprises default commands or pre-defined commands.

10. A method comprising:

providing a set of commands corresponding to predetermined angle ranges in memory of an electronic device, wherein the electronic device comprises a main body and a display unit pivotally connected to the main body via a hinge;

determining, by an angle detection unit disposed in the display unit and located below a display screen of the display unit and substantially in the middle of the display unit to reduce a size of the hinge, an angle of the display unit relative to the main body to determine angle information;

retrieving at least one command corresponding to the monitored angle information when the monitored angle falls within at least one of the predetermined angle ranges; and executing the at least one command to reduce power consumption of the electronic device.

11. The method of claim 10, wherein retrieving the at least one command corresponding to the determined angle information comprises:

determining a plurality of values of the angle of the display unit relative to the main body based on the determined angle information; and retrieving a set of commands corresponding to the plurality of values.

12. The method of claim 10, wherein executing the at least one command to reduce power consumption of the electronic device comprises:

progressively executing the set of commands at different included angles between the display unit and the main body when the display unit is rotated relative to the main body.

13. The method of claim 10, wherein the angle detection unit comprises a three-axis accelerometer.

14. The method of claim 10, wherein executing the at least one command to perform at least one of:

turning off a camera when the angle of rotation is in a range of 0 to 75 degrees or 135 to 315 degrees;

turning off a display screen when the angle of rotation is in a range of 0 to 75 degrees; placing the electronic device in a hibernation mode when the angle of rotation is in a range of 26 to 60 degrees;

placing the electronic device in a standby mode when the angle of rotation is in a range of 61 to 75 degrees;

shutting down the electronic device when the angle of rotation is in a range of 0 to 25 degrees;

turning off a microphone when the angle of rotation is in a range 0 to 25 degrees;

turning off a keyboard when the angle of rotation is in a range of 0 to 75 degrees or 181 to 360 degrees;

minimizing applications on a display screen when the angle of rotation is in a range of 0 to 75 degrees; and providing login accessibility when the angle of rotation is in a range 80 to 180 degrees.

* * * * *